United States Patent [19]

Smith et al.

[11] 4,053,592

[45] Oct. 11, 1977

[54] ANIMAL GROWTH PROMOTANT

[75] Inventors: Irvin Darrow Smith, Waukegan; Eugene Wesley Seymour, Libertyville, both of Ill.

[73] Assignee: Abbott Laboratories, North Chicago, Ill.

[21] Appl. No.: 341,819

[22] Filed: Mar. 16, 1973

[51] Int. Cl.$^2$ ............................................ A61K 31/71
[52] U.S. Cl. .................................................... 424/181
[58] Field of Search ......................................... 424/181

[56] References Cited

U.S. PATENT DOCUMENTS 2,885,321   5/1959   Hollis .................................... 424/181
3,662,063   5/1972   Berger et al. ......................... 424/181

FOREIGN PATENT DOCUMENTS 948,623   2/1964   United Kingdom ................. 424/181

OTHER PUBLICATIONS

*Experientia* 27/4 (1971) p. 362.

*Primary Examiner*—Frederick E. Waddell
*Attorney, Agent, or Firm*—Robert L. Niblack

[57] ABSTRACT

Covers a method of accelerating the growth of animals by incorporating anhydroerythromycin in their feed. Also covers a feed composition containing said anhydroerythromycin.

6 Claims, No Drawings

ANIMAL GROWTH PROMOTANT

DESCRIPTION OF THE INVENTION

Successful animal husbandry is contingent upon the rapid development and growth of the animal. The shorter the period of development can be made, the larger will be the return and margin of profit. The quicker that they can be grown to the proper size and sold in the marketplace, the higher the profit margin.

It has been found here that the growth of animals can be accelerated by providing in the various commercial animal feed compositions anhydroerythromycin. Addition of the compound causes an increase in weight and growth. The anhydroerythromycin compound may be used to accelerate the growth of a wide variety of animals such as pigs, chickens, turkeys, cattle, etc.

Anhydroerythromycin is a known compound having the following structure:

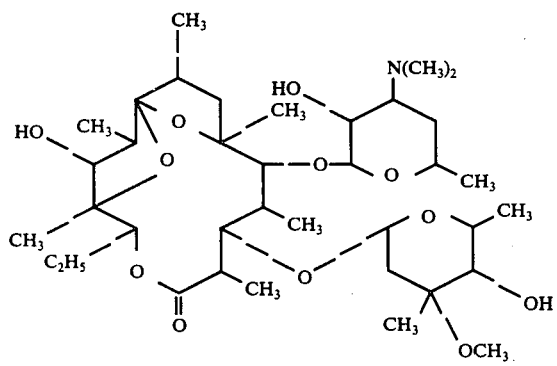

Its formation from erythromycin A is described, for example, in Experientia 27, 362 (1971).

The following examples are given to illustrate the invention but it should be understood that they are not intended to limit the invention in any way.

EXAMPLE I

In this experiment pigs averaging 9.5 lb. at the start were fed anhydroerythromycin in their basal ration and compared to littermate control groups which did not receive anhydroerythromycin. In the specific experiment there were a total of six replications in both the control group and treated group with four pigs per treatment in each replication. The experiment was carried on for 28 days.

Table I sets forth the basal rations used in the treatment. Five pounds of basal ration I was employed in the treatment followed by basal ration II for the remainder of the treatment.

TABLE I

| Ingredient | I | II |
| --- | --- | --- |
| Ground Corn Yellow | 25.0 | 49.0 |
| Solv. SBM (50% prot.) | 20.0 | 20.0 |
| Dried Whey (high lactose) | 10.0 | 15.0 |
| Dried Skim Milk | 30.0 | 5.0 |
| Dried Beet Pulp | 2.5 | — |
| Sucrose | 5.0 | 25 |
| Stabilized Lard | 2.5 | 2.5 |
| Calcium Carbonate | 0.2 | 0.5 |
| Dicalcium Phosphate | 0.3 | 1.0 |
| Iodized Salt | 0.5 | 0.5 |
| Trace Mineral Premix | 2.0[a] | 2.0[a] |
| Vitamin Premix | 2.0[b] | 2.0[b] |
| TOTAL | 100.0 | 100.0 |

TABLE I-continued

| Ingredient | I | II |
| --- | --- | --- |
| | Calculated Analysis | |
| Protein, % | 24.00 | 18.10 |
| Calcium, % | 0.68 | 0.69 |
| Phosphorus, % | 0.61 | 0.60 |
| Vit. A, I.U./lb. | 3,000.00 | 3,000.00 |
| Vit. D, I.U./lb. | 600.00 | 600.00 |
| Riboflavin, mg./lb. | 8.30 | 6.70 |
| Pantothenic Acid, mg./lb. | 18.30 | 16.10 |
| Niacin, mg./lb. | 26.80 | 26.30 |
| Choline, mg./lb. | 767.00 | 726.00 |
| Vit. $B_{12}$, mcg./lb. | 20.00 | 20.00 |

[a]Contributed the following per 100 lb. of diet: 5.6 gm. Mn; 1.8 gm. Fe; 180 mg. Cu; 60 mg. Co; 110 mg. I; 4.6 gm. Zn
[b]Contributed the following per 100 lb. of diet: 300,000 I.U. vit. A; 60,000 I.U. vit. D; 400 mg. riboflavin; 1 gm. pantothenic acid; 2 gm. niacin; 20 gm. choline; 2 mg. vit. $B_{12}$ Results of this experiment are shown in Table II. It can be seen that pigs receiving anhydroerythromycin gained faster and required less feed per unit of gain than pigs receiving just the basal ration.

TABLE II

| Anhydroerythromycin, gm./ton | 0 | 20 |
| --- | --- | --- |
| ADG*, lb. | | |
| Rep. 1 | 0.58 | 0.51 |
| 2 | 0.47 | 0.49 |
| 3 | 0.37 | 0.42 |
| 4 | 0.46 | 0.58 |
| 5 | 0.30 | 0.46 |
| 6 | 0.29 | 0.47 |
| AV. | 0.41 | 0.49 |
| F/G** | | |
| Rep. 1 | 1.85 | 1.85 |
| 2 | 2.17 | 2.31 |
| 3 | 2.24 | 2.07 |
| 4 | 1.90 | 1.86 |
| 5 | 2.49 | 1.95 |
| 6 | 2.48 | 210 |
| AV. | 2.19 | 2.03 |

*Average Daily Grain
**Feed Required Per Lb. Gain

EXAMPLE II

Here again pigs were treated as in Example I employing the same basal rations. Results as shown in Table II again demonstrate the efficacy of anhydroerythromycin in enhancing weight gain compared to the control.

TABLE III

| Anhydroerythromycin, gm./ton | 0 | 10 |
| --- | --- | --- |
| ADG*, lb. | | |
| Rep. 1 | 0.59 | 0.74 |
| 2 | 0.62 | 0.90 |
| 3 | 0.72 | 0.75 |
| 4 | 0.56 | 0.65 |
| 5 | 0.51 | 0.49 |
| 6 | 0.63 | 0.66 |
| AV. | 0.60 | 0.70 |
| F/G** | | |
| Rep. 1 | 2.03 | 2.11 |
| 2 | 1.99 | 1.89 |
| 3 | 1.76 | 1.88 |
| 4 | 1.85 | 1.76 |
| 5 | 1.91 | 1.79 |
| 6 | 1.84 | 1.85 |
| AV. | 1.90 | 1.88 |

*Average Daily Gain
**Feed Required Per Lb. Gain

EXAMPLE III

Here White Rock day-old cockerels were employed to determine the growth stimulant properties of anhydroerythromycin. Each treatment group consisted of four replicates with six chicks alloted to each replicate. The basal diet is shown in Table IV.

TABLE IV

| Ingredient | % |
|---|---|
| Sucrose | 60.4 |
| Casein (Crude) + small % of Vit. Free | 20.0 |
| Gelatin | 8.0 |
| Calcium gluconate . H$_2$O | 5.0 |
| Salt mixture* | 2.25 |
| Tricalcium phosphate | 1.75 |
| Vitamins in dextrose** | 1.0 |
| Cystine-L | 0.4 |
| Choline chloride | 0.2 |
| Corn oil | 1.0 |
|  | 100.0 |

| *Salt Mixture | Gms. per 100 gms. diet |
|---|---|
| Sodium chloride | 0.600 |
| Dipotassium phosphate | 0.600 |
| Monopotassium phosphate | 0.450 |
| Magnesium sulfate. H$_2$O | 0.250 |
| Manganese sulfate | 0.038 |
| Ferric citrate | 0.050 |
| Copper sulfate | 0.002 |
| Potassium iodide | 0.0006 |
| Zinc sulfate | 0.015 |
| Cobalt (ous) chloride (CoCl$_2$. 6H$_2$O) | 0.0004 |
| Sodium molybdate | 0.00005 |

| **Vitamin Mixture | Gms. per 100 gms. diet |
|---|---|
| Thiamine hydrochloride | 0.001 |
| Riboflavin | 0.001 |
| Niacinamide | 0.005 |
| Pyridoxine | 0.001 |
| Calcium pantothenate | 0.005 |
| Folic acid | 0.0005 |
| Klotogen F (Vit. K) | 0.0005 |
| Biotin | 0.00002 |
| Vitamin B-12 | 0.000005 |
| Vitamin A (Dawes) | 1,500 units |
| Vitamin D-3 (Dawes) | 201 units |
| Vitamin E (Myoamix) | 10 mg. |

Chicks treated just with the basal diet had an average weight gain of 266 g. in four weeks. Chicks whose basal diet also contained anhydroerythromycin had an average weight gain of 319 g. in four weeks or a 20.1 percentage increase over control.

It should be understood that this invention is meant to include the administration of anhydroerythromycin in forms other than as a solid in feed mixes. Thus, for example, the growth of animals can be promoted by adding the anhydroerythromycin to their drinking water. When dispersed in a feed the anhydroerythromycin is normally present in an amount of 2 – 100 g. per ton of feed.

The anhydroerytheromcyin may be used with a wide variety of conventional feed ingredients including ground barley, ground wheat, ground kafir and milo, bone scraps, cornmeal, corn gluten meal, cane feeding molasses, condensed fish solubles containing fish liver and glandular products, fish meal, yellow hominy feed, and inorganic mineral salts. Also other feed additives can be incorporated in the feed composition of the invention including D-activated animal sterol (source of vitamin D-3), vitamin B$_{12}$ supplement, procain penicillin, riboflavin supplement, calcium pantothenate, niacin, choline chloride, 3-nitro-4-hydroxyphenylarsonic acid, phenylarsonic acid, halogenated phenylarsonic acid, p-hydroxyphenylarsonic acid, the alkaline diamine salts of halo-phenylarsonic acid and arsanilic acid.

We claim:

1. A method of increasing the rate of growth of warm-blooded vertebrate animals including pigs, comprising orally administering to said warm-blooded vertebrate animals a feed composition containing an amount of 2–100 grams of anhydroerythromycin per ton of said feed composition, whereby growth of said animals is accelerated.

2. The method of claim 1 wherein said feed composition is a swine feed composition.

3. The method of claim 1 wherein said feed composition is a polutry feed composition.

4. An animal feed composition comprising a solid animal nutritional vehicle adapted for oral ingestion and having dispersed therethrough an amount of 2–100 grams of an anhydroerythromycin per ton of said feed composition.

5. The composition of claim 4 wherein said nutritional vehicle is a poultry feed.

6. The composition of claim 4 wherein said nutritional vehicle is a swine feed.

* * * * *